United States Patent
Rotering

[19]

[11] Patent Number: 6,010,113
[45] Date of Patent: Jan. 4, 2000

[54] DAMPER WITH FANNING BLADES

[75] Inventor: Leisha Rotering, Minneapolis, Minn.

[73] Assignee: Honeywell, Inc., Minneapolis, Minn.

[21] Appl. No.: 09/097,352

[22] Filed: Jun. 15, 1998

[51] Int. Cl.⁷ ...................................................... F16K 3/06
[52] U.S. Cl. ............................................................. 251/212
[58] Field of Search ............................................. 251/212

[56] References Cited

U.S. PATENT DOCUMENTS

| | | |
|---|---|---|
| 1,449,583 | 3/1923 | Buck . |
| 2,649,272 | 8/1953 | Barbato .................................. 251/212 |
| 3,068,891 | 12/1962 | Panning et al. . |
| 3,159,179 | 12/1964 | De Lain ............................... 251/212 X |
| 3,319,560 | 5/1967 | Schaaf . |
| 4,094,492 | 6/1978 | Beeman et al. .......................... 251/212 |
| 4,188,862 | 2/1980 | Douglas, III . |

*Primary Examiner*—Kevin Lee
*Attorney, Agent, or Firm*—Nawrocki, Rooney & Sivertson, P.A.

[57] ABSTRACT

A baffle system for control of fluid delivery using manual or automatic control. The fluid supply bore is controllably occluded using a plurality of individual baffle elements. Each of the individual baffle elements is secured at two places.

10 Claims, 11 Drawing Sheets

DAMPER WITH FANNING BLADES

CROSS REFERENCE TO CO-PENDING APPLICATIONS

None.

BACKGROUND OF THE INVENTION

1. Field of the Invention

The present invention generally relates to devices for adjustably occluding a fluid stream and more particularly relates to a damper assembly for a forced-air system employing a plurality of fanned blades to provide a regulated flow of air.

2. Description of the Prior Art

It has been known in residential and commercial heating, cooling, and ventilation systems to control temperature, humidity, and other environmental characteristics through regulation of air flow. Most commonly in forced-air systems, this takes the form of one or more dampers to control the volumetric flow rate in each of the conditioned spaces.

The most common damper assemblies utilize an air supply register having a circular or rectangular cross sectional bore, which is manually or electromechanically occluded using a baffle of appropriate geometry. In this form, the air supply bore is fully occluded when the plane of the baffle is placed perpendicular to the axis of flow of the air supply. Similarly, maximum air is supplied when the plane of the baffle is parallel with the axis of the air flow. Partial occlusion is accomplished as the baffle is manually or electromechanically rotated at angles between parallel to the air flow and perpendicular to it. Though this simplistic approach provides for manufacture using a small number of components, it produces an assembly which tends to require substantial clearance along the direction of the air flow. Thus, this approach is not useful for applications which do not have sufficient clearance.

One method of decreasing the required clearance parallel to the axis of air flow is to provide baffles which are essentially fixed. U.S. Pat. No. 1,449,583 suggests the use of static baffles. However, this design simply does not give the degree of control over environmental characteristics expected of modern systems.

Several approaches have been presented which offer a compromise between clearance and performance. U.S. Pat. No. 3,319,560, issued to Schaaf, shows a system employing flexible baffles. In this way, the required clearance is less and the performance is somewhat enhanced. However, this does represent a compromise and thus requires greater than minimal clearance and provides less than optimal performance.

Another type of compromise is shown in U.S. Pat. No. 3,068,891, issued to Panning et al. Using the Panning et al. technique, the bore is partially, but permanently, occluded with a plurality of fixed baffles and adjustably occluded with a plurality of rotatable baffles. This method provides a minimum of required clearance. However, because of the fixed baffles, the bore is at least partially occluded, even at maximum flow. Thus, performance is compromised.

U.S. Pat. No. 1,449,583, issued to Buck, utilizes a plurality of stacked discs. The discs are rotated into the bore to adjustably occlude the fluid flow. However, because of the manner in which the discs are used for baffling, the degree of occlusion cannot be easily and readily modified during operation.

A more elegant suggestion is made in U.S. Pat. No. 4,188,862, issued to Douglas, III. In this approach, a plurality of smaller occlusion baffles are stacked and adjustably spread in fan-like fashion coaxially within the fluid flow bore to achieve the desired amount of occlusion. The clearance requirement tends to be minimized, because the individual occlusion baffle elements are small in relation to the total cross sectional area of the fluid flow bore. However, performance can be optimized through the use of a relatively large number of relatively small surface area baffle elements necessitating a minimal occluded surface area during full output operation.

However, Douglas III does not address the key factors for providing an optimum and operable embodiment. As stated above, performance is enhanced with a larger number of smaller baffle elements. Yet this promotes additional flexure of the elements relative to one another. Such flexure tends to prevent complete occlusion and is most prominent between the upper most and lower most of the stacked baffle elements. Additionally, the relative movement of the baffle elements precludes accuracy of adjustment at varying pressures and prevents fully automated, precise operation.

SUMMARY OF THE INVENTION

The present invention overcomes the disadvantages found in the prior art by providing a system suitable for employing a relatively large number of relatively small surface area baffle elements. This configuration ensures minimal axial clearance while promising optimal performance. In addition, the present invention provides the individual baffle elements with freedom of coaxial motion, yet prevents motion parallel to the direction of fluid flow.

In one preferred embodiment of the present invention, the inner edge of each individual baffle element is rotatably anchored at the center of a circular fluid flow bore, and the outer edge is slidably anchored within a grooved track about the outer periphery of the fluid flow bore. In this manner, the opposing edges are constrained in the direction of the fluid flow axis and the individual baffle elements are not permitted to flex parallel to the direction of air flow. This ensures maximum closure between baffle elements, even under varying pressures. Accuracy is further enhanced by providing the grooved track in a slightly helix shape. In this manner, the grooved track permits accommodation of the thicknesses of the plurality of baffle elements.

Furthermore, special provisions are needed to ensure an adequate seal between the baffle element from the top of the stack and the baffle element from the bottom. This condition occurs during maximum occlusion. Because these two baffles are spaced apart along the flow axis due to the thickness of the intervening baffle elements, performance is enhanced by providing a seal extending parallel to the fluid flow axis between the leading edge of the top baffle element and the trailing edge of the bottom baffle element.

In additional preferred embodiments, movement of the plurality of baffle elements is provided by electromechanical means, such as an electric motor. Removing the flexure from the individual baffle elements ensures that the electric motor can accurately position the baffle elements for the desired degree of occlusion. The electric motor may be coupled to the baffle elements through a gear train which enhances the precision. The electric motor may operate at the center of the fluid flow bore on the rotatable inner edge of the individual baffle elements or at the outer periphery of the fluid flow bore on the slidable outer edge of the baffle elements.

Yet further embodiments of the present invention link adjacent ones of the individual baffle elements using a tab on one baffle element which is slidable within an aperture of an adjacent baffle element. Manufacturability is enhanced by fabricating all individual baffle elements as identical. However, because the windows of adjacent individual baffle elements are not normally registered because of the relative movement of the baffle elements, performance is not appreciably sacrificed.

Even though the most convenient shape for the damper naturally occludes a circular bore, additional preferred embodiments are useful for controlling rectangular bores.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is described in accordance with several preferred embodiments which are to be viewed as illustrative without being limiting.

Figure 1:
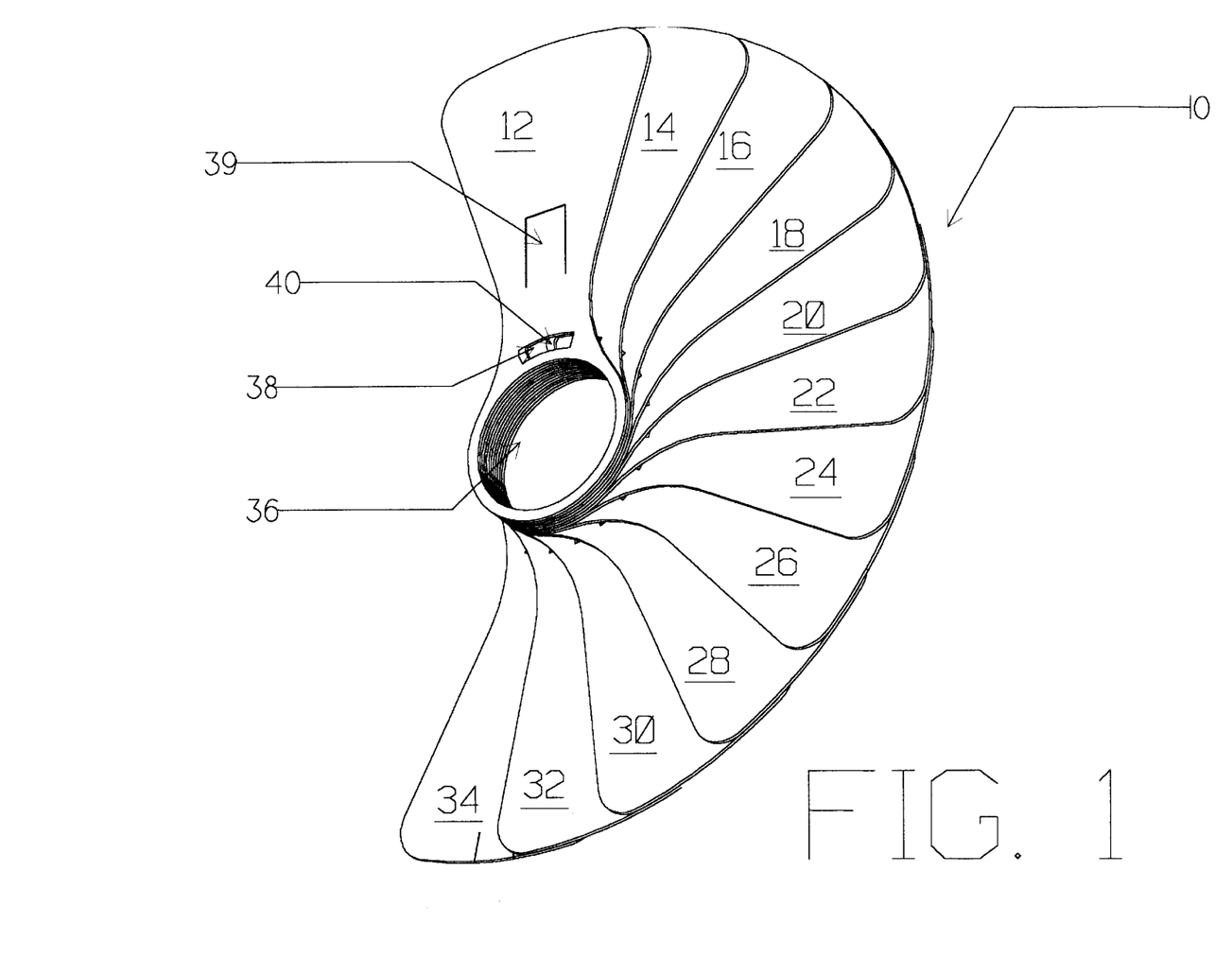
FIG. 1 is an isometric view of a plurality of baffle elements in accordance with the present invention.

FIG. 1 is an isometric view of the plurality 10 of individual baffle elements. Each of the individual elements 12, 14, 16, 18, 20, 22, 24, 26, 28, 30, 32, and 34 is rotatably attached at hub 36, permitting minimal occlusion when all elements overlap and increasing occlusion as the elements are rotated in the counterclockwise direction. It is noted that the exact number of baffle elements may vary from application to application. However, a larger number of smaller surface area baffle elements permits the least minimum occlusion when completely overlapped.

As shown in the figure, baffle element 14 has a tab 40 which is raised above the plane of baffle element 14 and is free to slide within aperture 38 of baffle element 12. Thus baffle elements 12 and 14 are rotatably engaged such that elements 12 and 14 may rotate from fully overlapped to a position of fully extended which presents the maximum effective occlusion surface area.

Each of the adjacent baffle elements is similarly slidably engaged having an aperture and a tab, not shown. Each of the individual baffle elements is identical to reduce part count and enhance manufacturability. However, because the apertures of adjacent baffle elements normally move relative to one another, the apertures are rarely registered to the point of decreasing performance.

Each individual baffle element has a perforated tab 39, as shown with reference to individual baffle element 12. However, the tab is raised only for leading individual baffle element 12 and not for the remaining individual baffle elements. Tab 12 engages motive aperture 45 as is discussed below.

Figure 2:
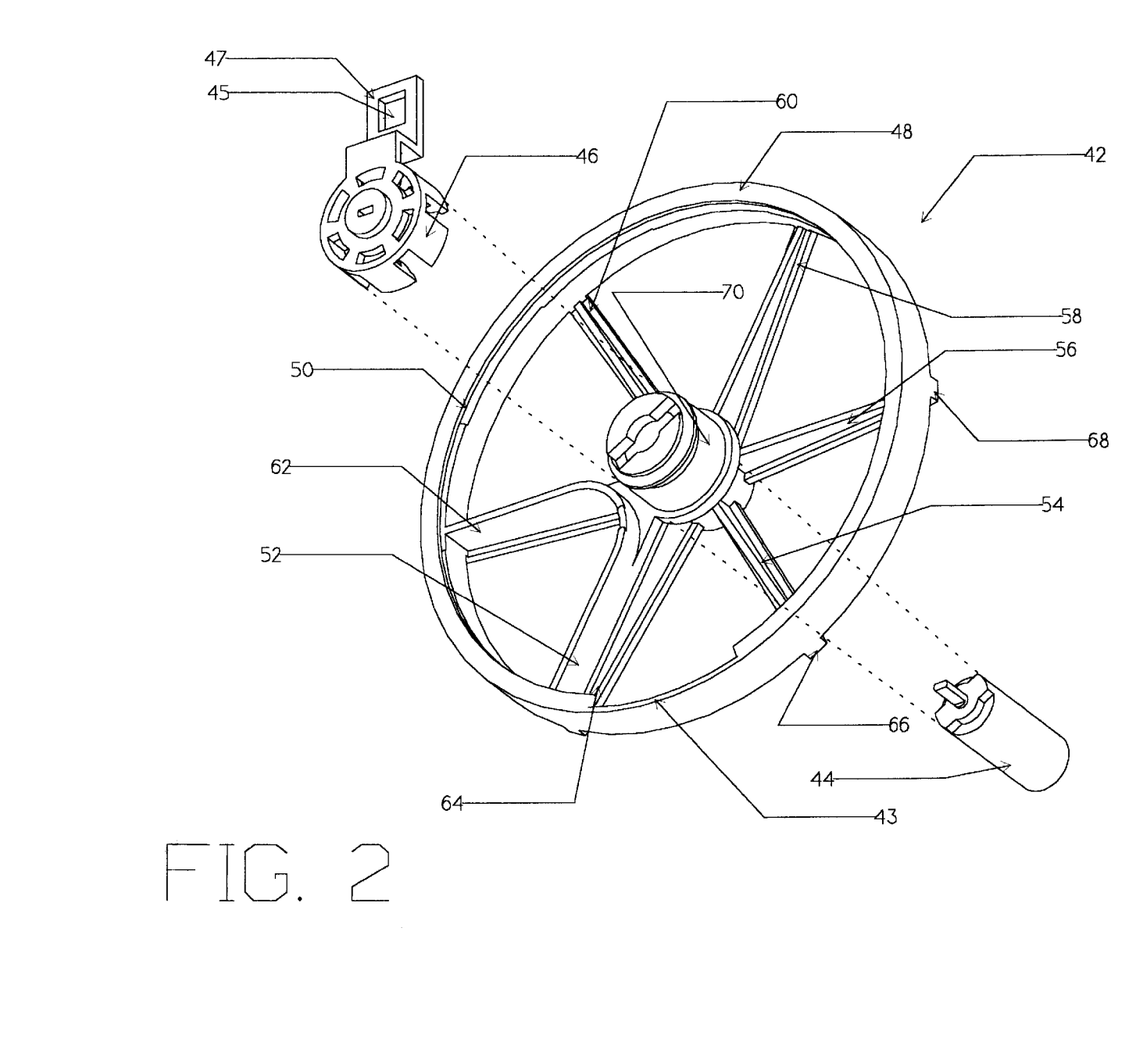
FIG. 2 is a partially exploded view of the support structure.

FIG. 2 is a partially exploded view of damper assembly 42 of the preferred embodiment of the present invention without the plurality of individual baffle elements 10. Frame 48 may be of cast, molded, stamped, or other convenient construction. In the preferred mode, frame 48 is generally of circular construction. Support elements 54, 56, 58, 60, 62, and 64, seen also at the periphery as protrusions 66 and 68, rigidly support hub assembly 70. Note that support element 62 has an increased thickness to enhance rigidity. The inner edges of each of the plurality of individual baffle elements 10 (see also FIG. 1) are rotatably coupled at hub assembly 70. The diameter of frame 48 is selected to provide maximum control of the intended fluid flow bore.

In various embodiments, manual control is desired. However, in the preferred embodiment, electric motor 44 is coupled to the hub assembly 70, as shown, to provide controlled movement of the plurality of individual baffle elements 10. Greater precision is provided in the preferred embodiment through the use of gear train assembly 46, which permits more precise control of the degree of occlusion by "gearing down" the output of electric motor 44. Motive aperture 45 of coupling tab 47 is used to engage perforated tab 39 of individual baffle element 12 (see also FIG. 1) to permit motor 44 to position the individual baffle elements as desired.

A screen is utilized to ensure a tight seal between the trailing edge of baffle element 34 and the leading edge of baffle element 12 (see also FIG. 1). The leading edge of baffle element 12 seals and the trailing edge of baffle element 34 seal against sealing member 52 during full occlusion.

A grooved track 50 is provided to slidingly engage the outer edges of the plurality of individual baffle elements 10. In the preferred embodiment, grooved track 50 has a maximum width at a first edge of sealing member 52 (i.e. the seal against individual baffle element 34) and a continuously decreasing width toward the other edge of sealing member 52. This accommodates the varying thicknesses of the multiple individual baffle elements 10. For example, grooved track 50 must accommodate the thickness of all of the stacked plurality of individual baffle elements 10 at on edge of sealing member 52, whereas it need accommodate only the thickness of baffle element 12 at the other edge of sealing member 52. The individual baffle elements must be conveniently installed within the control of grooved track 50. If frame 48 is of two-piece construction, the individual baffle elements may be installed as the two pieces are joined. However, if frame 48 is of a single piece, it is convenient to provide an entrance area 43 to accommodate assembly.

Figure 3:
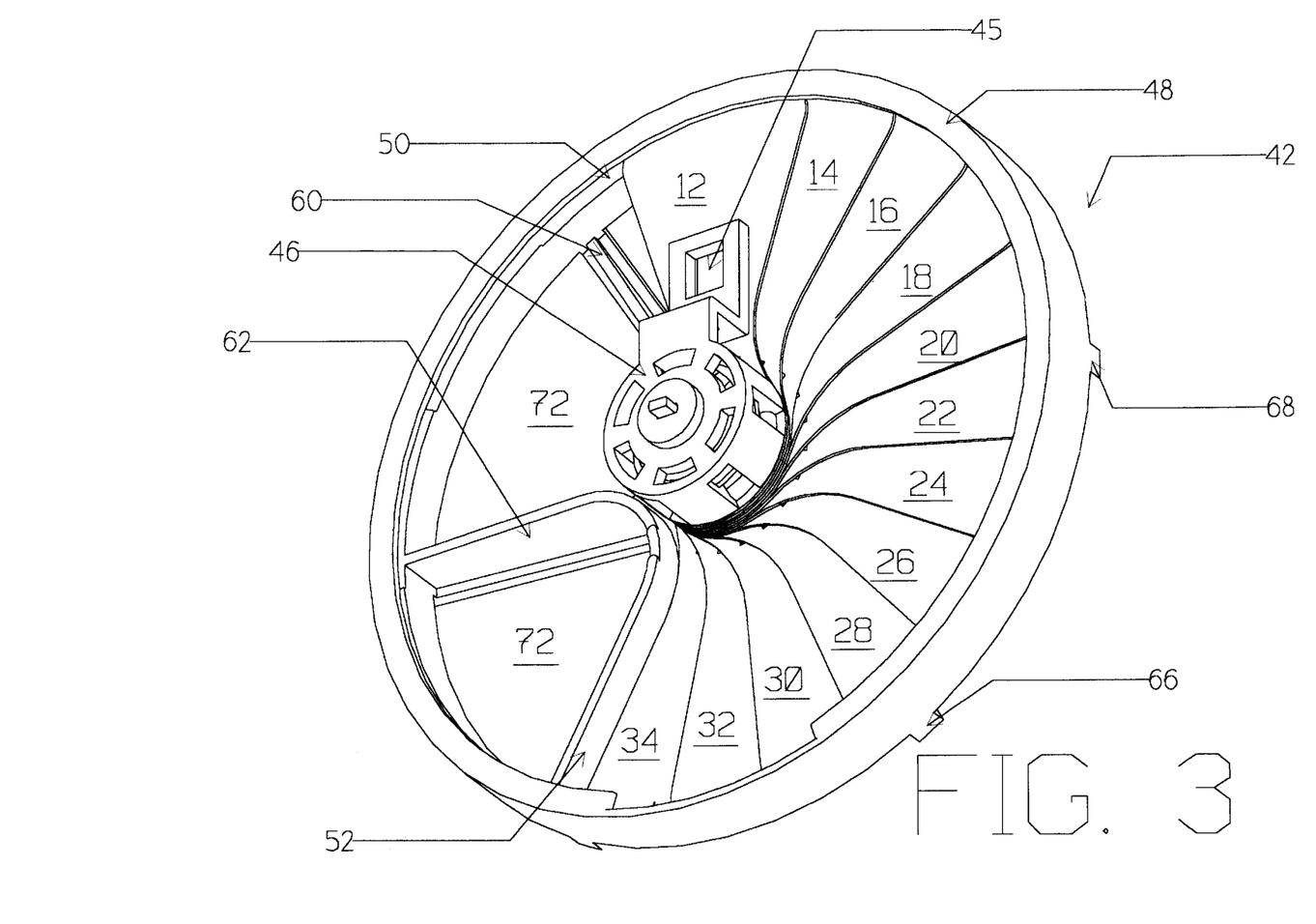
FIG. 3 is an isometric view of the assembled damper as viewed from the higher pressure side.

FIG. 3 is an isometric view of the completely assembled damper system 42 as viewed from the higher pressure side. As shown, damper assembly has occluded all but open surface area 72. All other referenced elements are as previously described.

Figure 4:
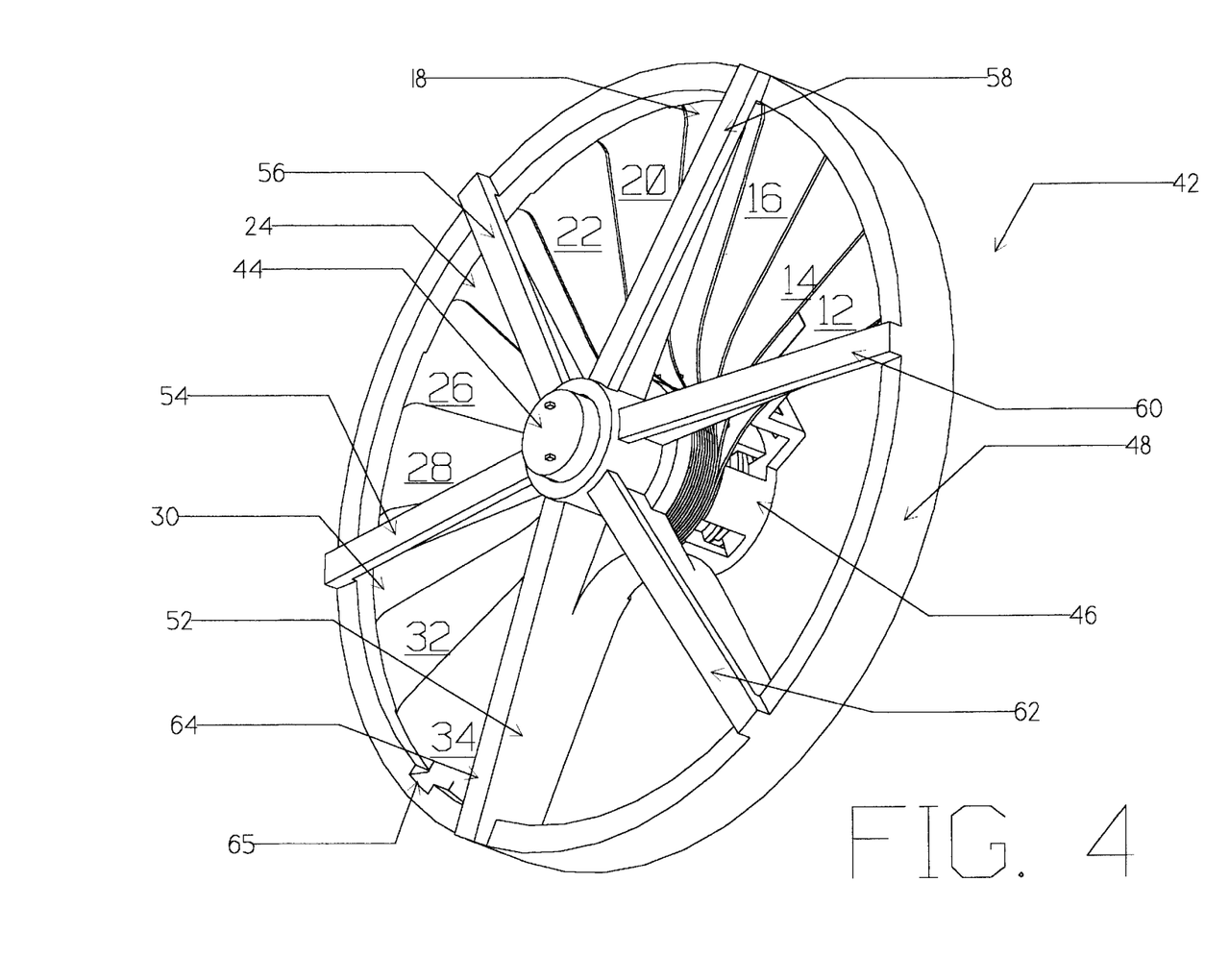
FIG. 4 is an isometric view of the assembled damper as viewed from the lower pressure side.

FIG. 4 is an isometric view of the completely assembled damper system 42 as viewed from the lower pressure side. All other referenced elements are as previously described.

Figure 5:
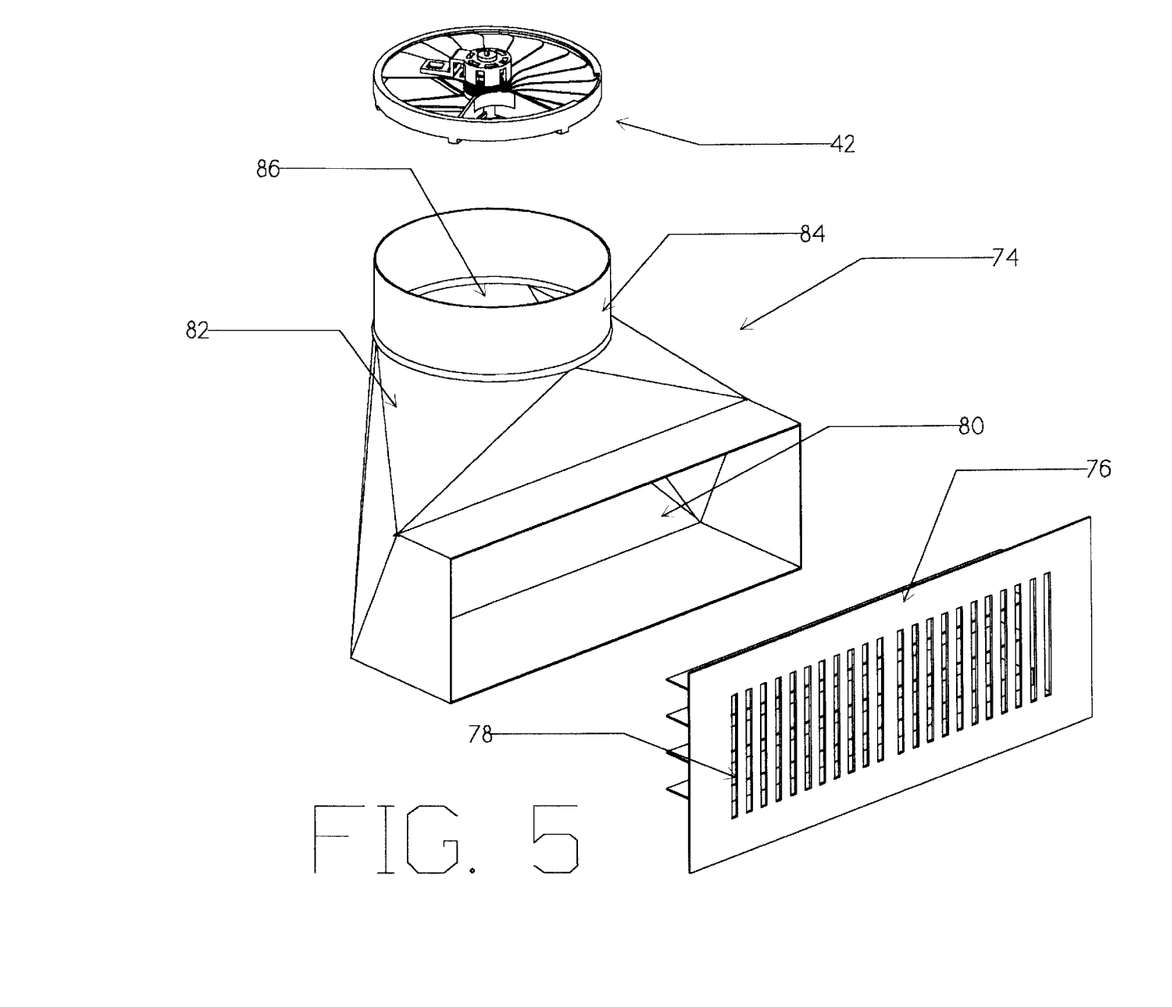
FIG. 5 is an exploded view of the damper of the present invention in a typical application.

FIG. 5 is an exploded view of a typical residential application of damper system 42. It is customary to distribute the conditioned air in a heating/cooling/ventilation system using closed tubing having a circular cross section.

The air supply register system 74 contains transition element 82 to convert the circular cross section supply 84 to a rectangular distribution bore 80 which readily accommodates a rectangular diffusion register 76 having diffusion slots 78. Damper system 42 is sized to snugly fit within circular bore 86 as shown.

Figure 6:
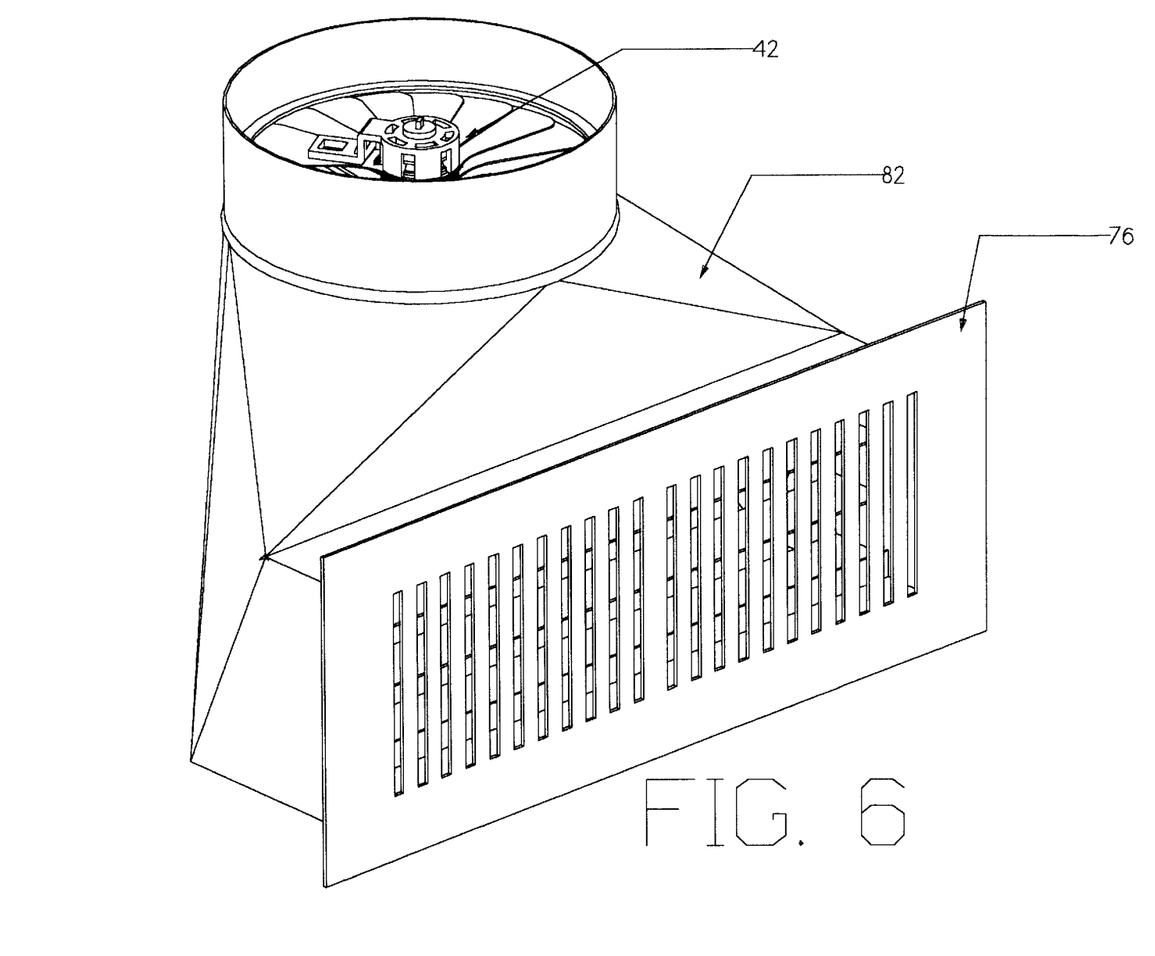
FIG. 6 is an isometric view of the typical application of FIG. 5.

FIG. 6 is an isometric view of the assembled air supply register system 74 containing damper system 42. All other referenced elements are as previously described.

Figure 7:
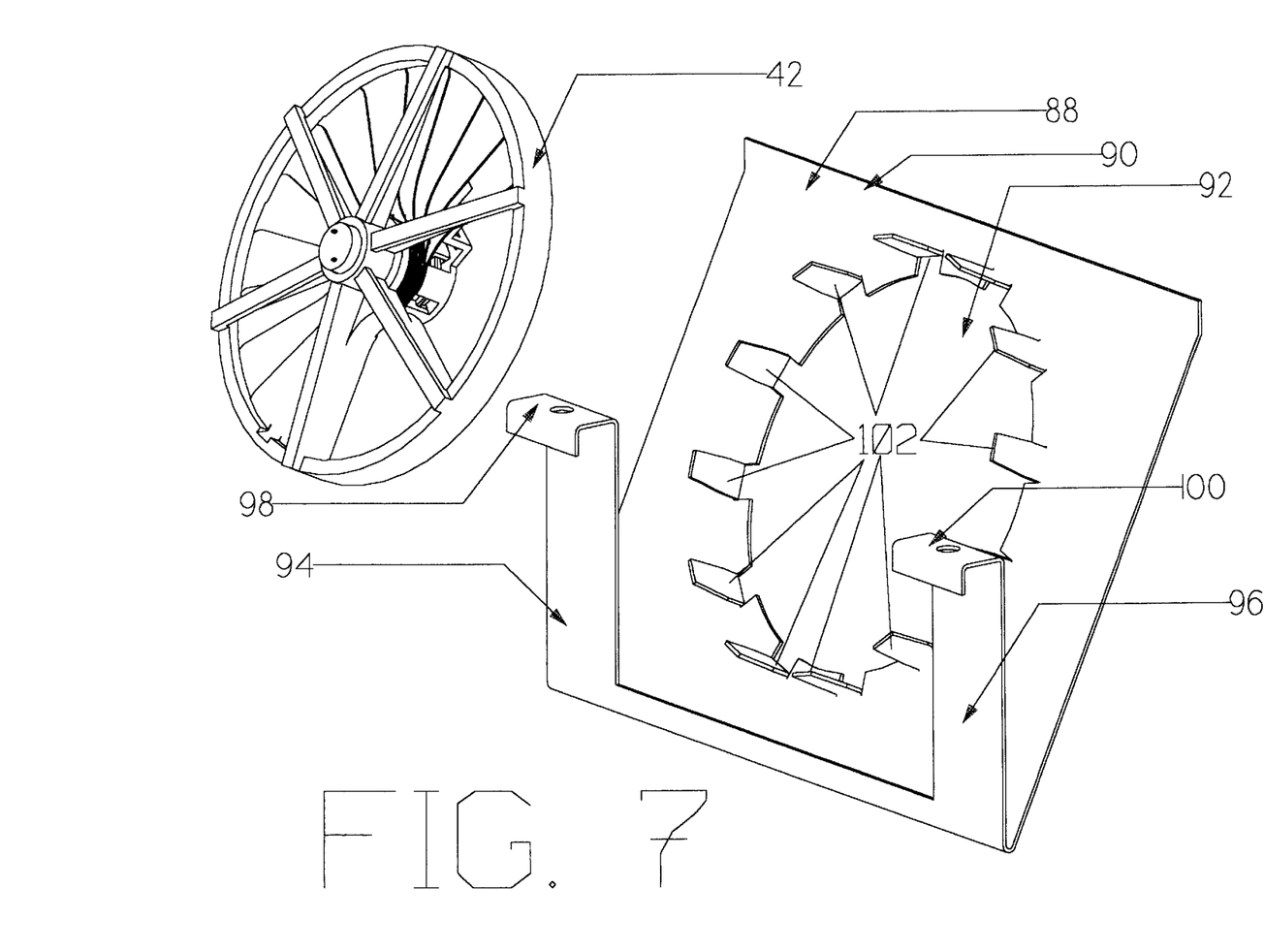
FIG. 7 is an exploded view of the damper of the present invention as used to control flow in a duct of rectangular cross section.

FIG. 7 is an exploded view of damper system 42 to be used to occlude an air supply bore of rectangular cross section. Such air supplies are typically fitted between studs in standard residential construction. This application relies upon an adapter plate 88 which is sized to snugly fit within the air supply bore of rectangular cross section. Adapter plate 88 has a circular aperture 92 which snugly accommodates the outer periphery of damper system 42. Attachment tabs 102 may be utilized to more securely hold damper system 42 to adapter plate 88.

For this application, adapter plate 88 mounts within the air supply bore of rectangular cross section at an angle to the axis of air flow. This angle is maintained by angular lip 90 and the corresponding angle at which uprights 94 and 96 are mounted with regard to adapter plate 88. As properly installed, angular lip 90 and uprights 94 and 96 are parallel to the axis of air flow. Mounting brackets 98 and 100 provide for secure attachment as is shown in FIG. 9.

Figure 8:
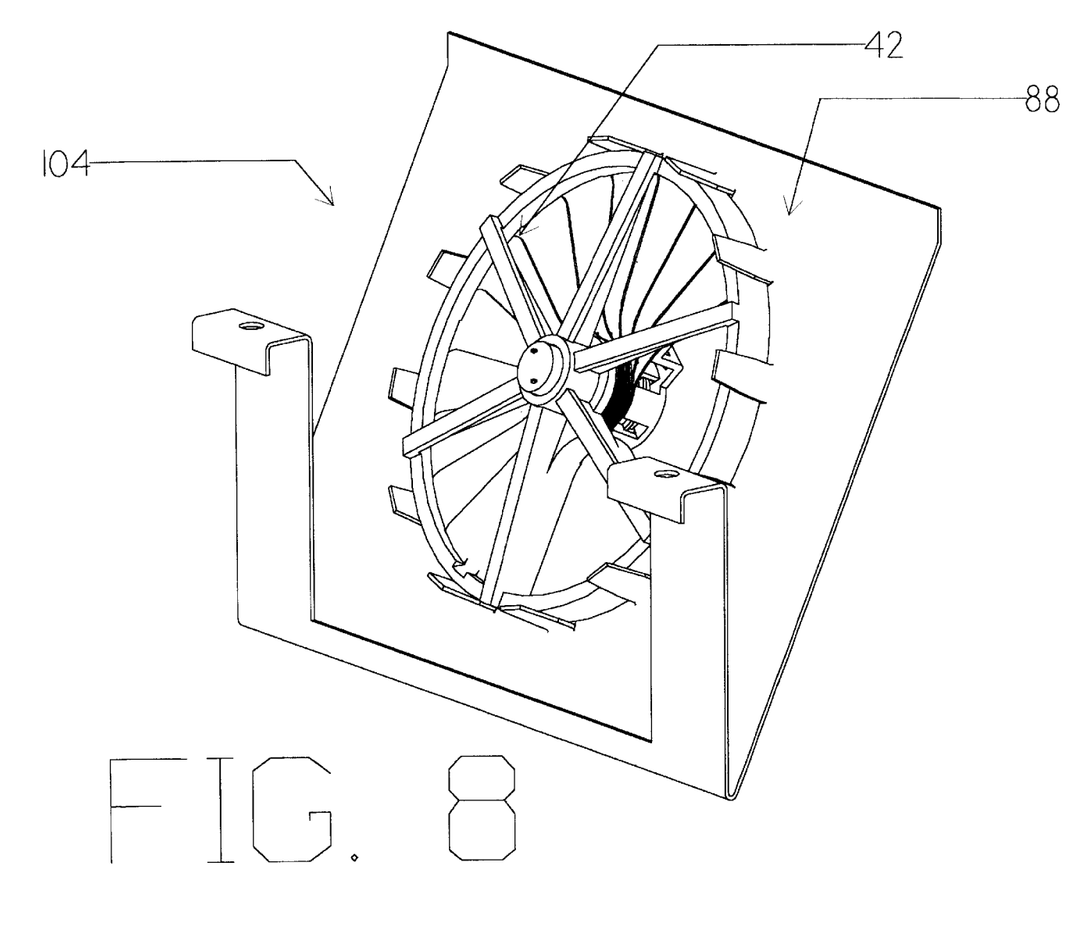
FIG. 8 is an assembled view of the application of FIG. 7.

FIG. 8 is an isometric view of occluder 104 consisting of damper system 42 as securely attached to adapter plate 88. All other elements are as previously described.

Figure 9:
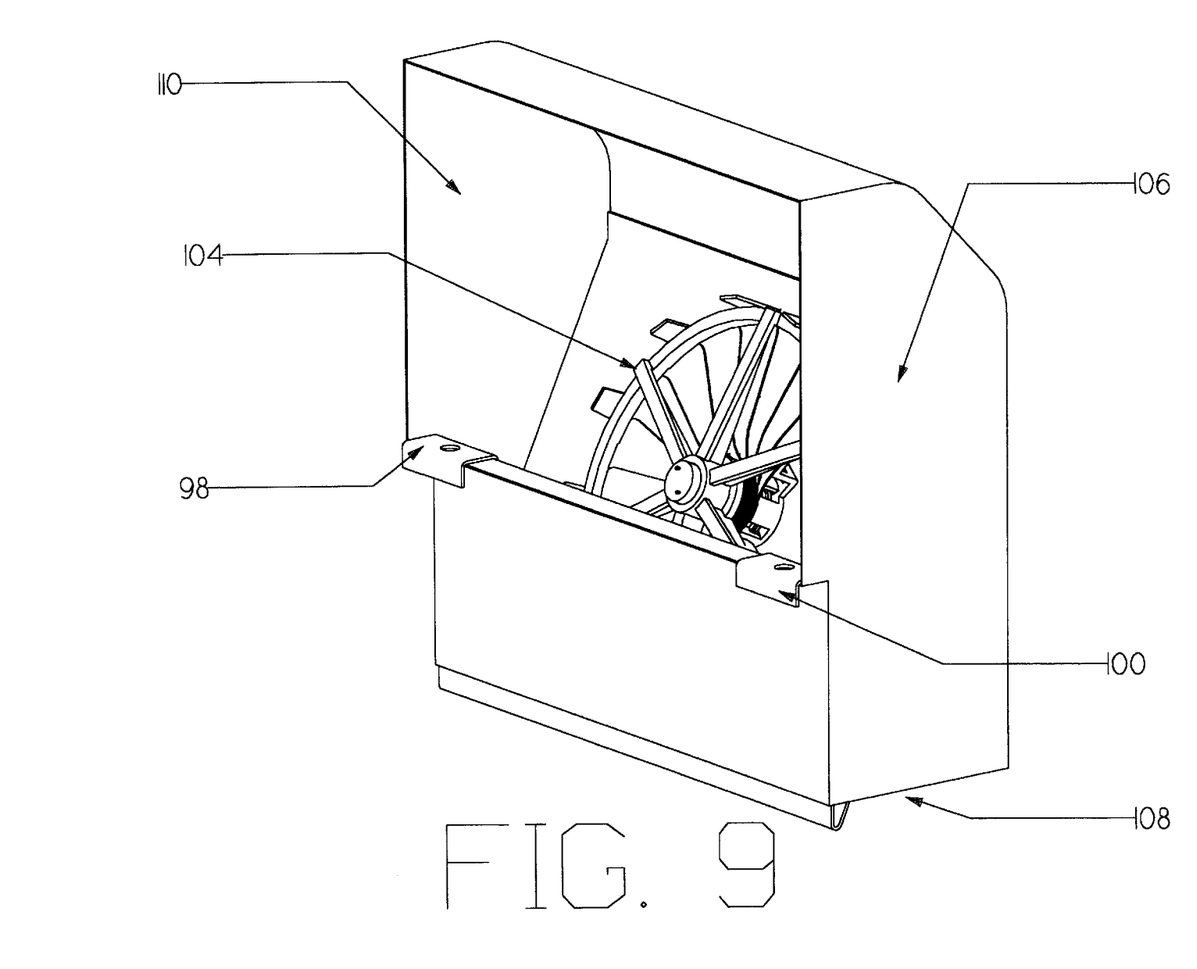
FIG. 9 is an assembled view of the application of FIG. 8 with diffuser removed.

FIG. 9 is an isometric view of occluder 104 as installed in rectangular supply duct 106. Note the angle at which occluder 104 is attached. Mounting brackets 98 and 100 provide attachment using a standard fastener as shown. In this application, damper system 42 is utilized to control air flow within rectangular supply duct 106 having a supply bore 108 and an output bore 110, both having rectangular cross sections.

Figure 10:
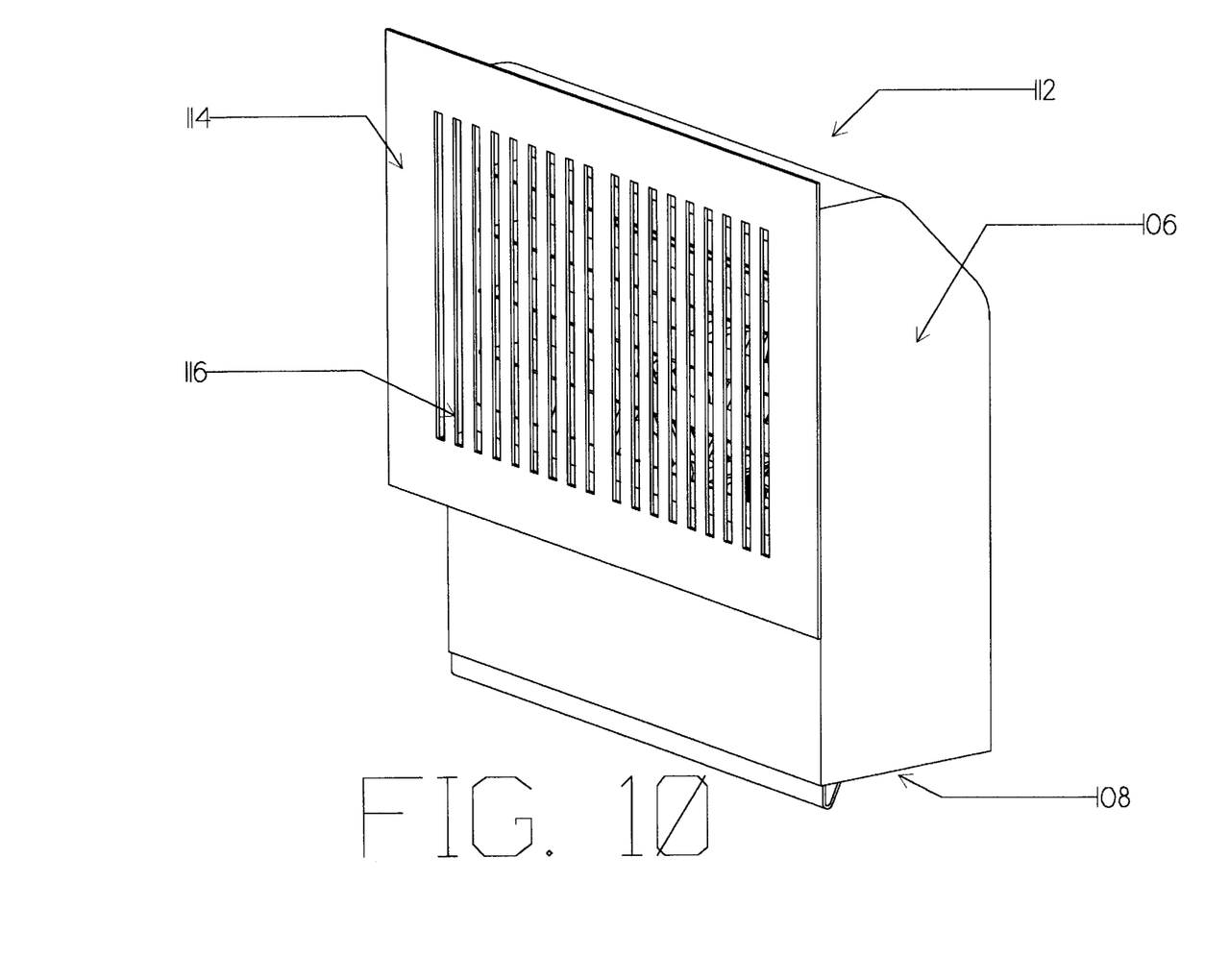
FIG. 10 is a view of the completely assembled application of FIG. 9.

FIG. 10 is an isometric view of fully assembled rectangular supply register system 112. It consists of rectangular supply duct 106 with register diffuser assembly 114, having diffuser slots 116, attached. All other referenced elements are as previously described.

Figure 11:
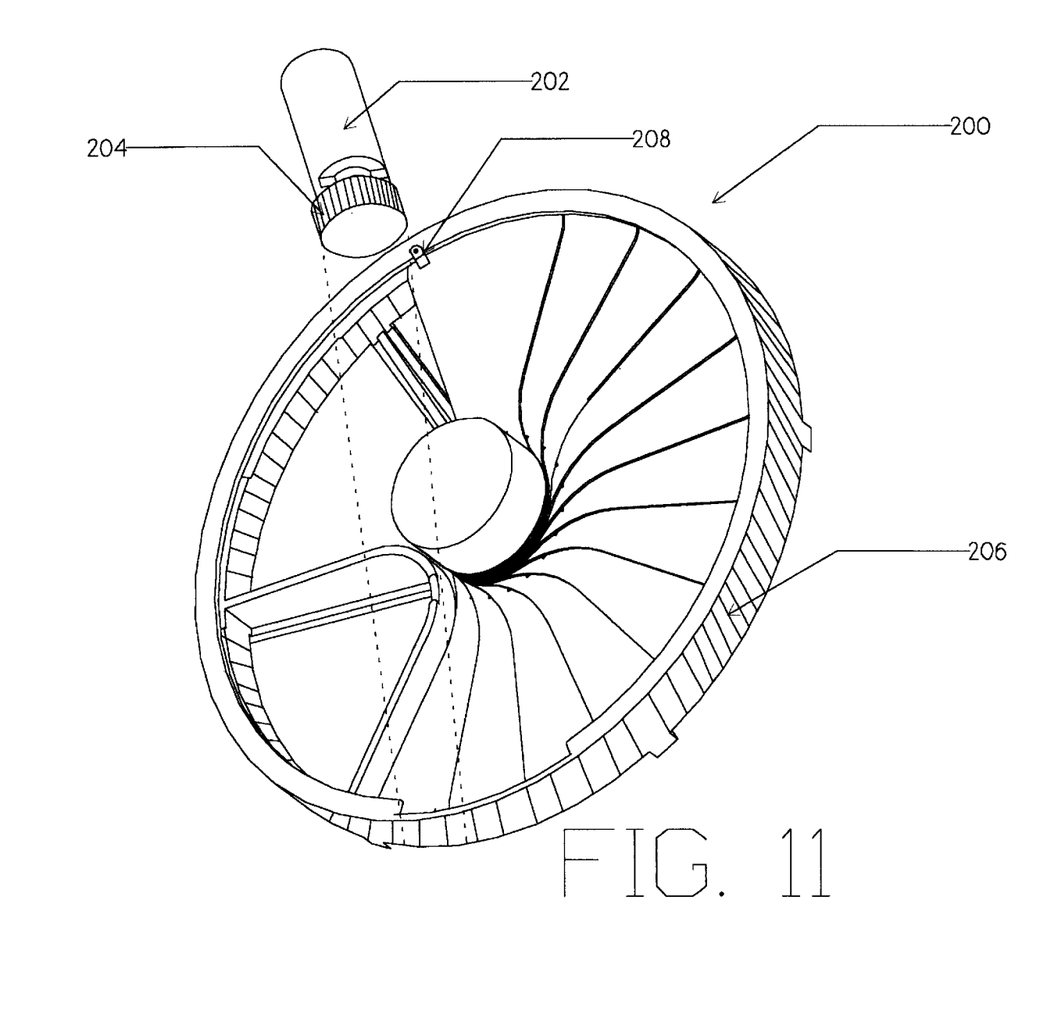
FIG. 11 is an isometric view of an alternative method of powering the damper of the present invention.

FIG. 11 is an exploded view of alternative embodiment 200 of the present invention. In this alternative embodiment, electric motor 202 is coupled via output gear 204 to gear teeth 206 on the outer periphery of alternative embodiment 200. In this embodiment, the leading one of the plurality of individual baffle elements is fixedly coupled to the outer periphery such that the occluder may be adjusted by movement of the outer ring relative to the hub.

Having thus described these preferred embodiments of the present invention, those of skill in the art will be readily able to apply the teachings found herein to yet other embodiments within the scope of the claims hereto attached.

I claim:

1. An apparatus comprising:
   a. a plurality of baffle elements which are movable in fanlike fashion with respect to each other; and
   b. a hub assembly rotatably attached to said plurality of baffle elements at a first place, a frame, slideably attached to said plurality of baffle elements at a second place, and support elements, attaching said hub assembly to said frame.

2. An apparatus according to claim 1 wherein said hub assembly defines a bore and said first place is at the center of said bore.

3. An apparatus according to claim 2 wherein said frame has a circular cross section having an inner periphery.

4. An apparatus according to claim 3 wherein said second place is at said inner periphery of said of said frame.

5. An apparatus according to claim 4 wherein said second place is a grooved track about and inner periphery of said frame.

6. An apparatus according to claim 5 further comprising a sealing member for sealing a first one of said plurality of baffle elements against a second one of said plurality of baffle elements.

7. An apparatus according to claim 6 wherein each of said one of said plurality of baffle elements has an aperture and a raised tab wherein said raised tab of a third one of said plurality of baffle elements is slidable coupled to said aperture of a fourth one of said plurality of baffle elements.

8. An apparatus according to claim 7 wherein each of said plurality of baffle elements is identical.

9. An apparatus as in one of claims 1–8, further comprising an electric motor for moving said plurality of baffle elements in fan-like fashion.

10. An apparatus as in one of claims 1–8, further comprising means for manual control.

\* \* \* \* \*